T. L. GOOD & T. L. TANDY.
AUTOMOBILE WHEEL.
APPLICATION FILED NOV. 11, 1916.
1,221,529.
Patented Apr. 3, 1917.
2 SHEETS—SHEET 1.
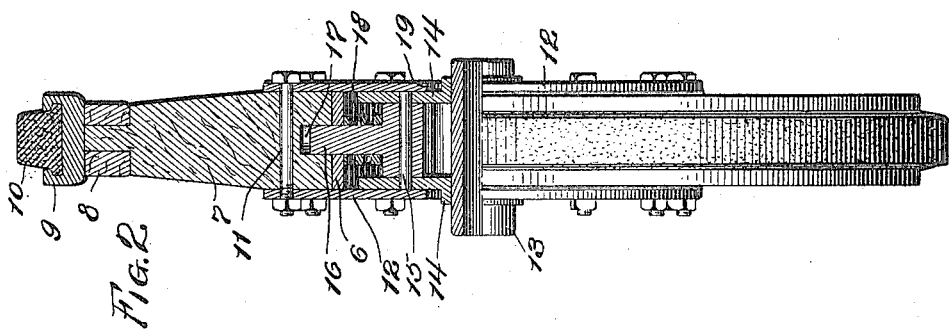
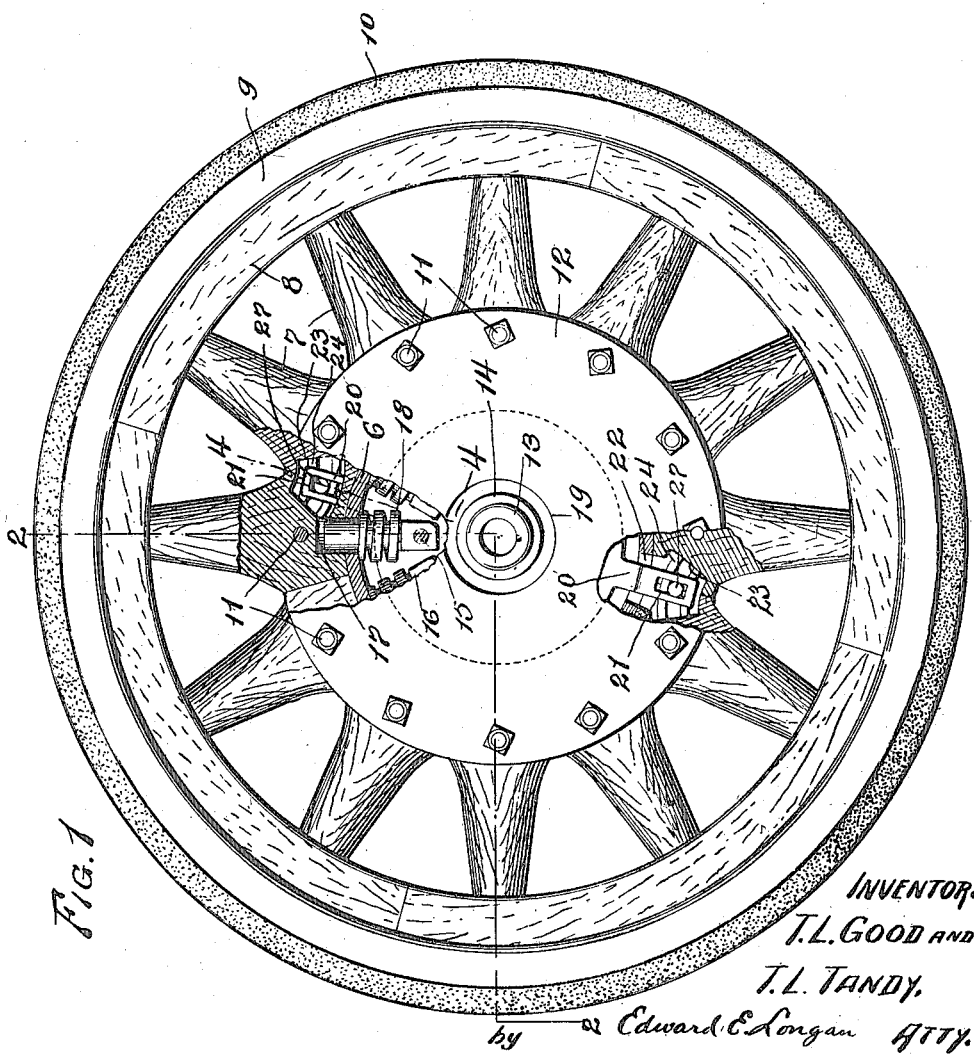
INVENTORS
T. L. GOOD AND
T. L. TANDY,
by Edward E. Longan ATTY.

T. L. GOOD & T. L. TANDY.
AUTOMOBILE WHEEL.
APPLICATION FILED NOV. 11, 1916.
1,221,529.
Patented Apr. 3, 1917.
2 SHEETS—SHEET 2.
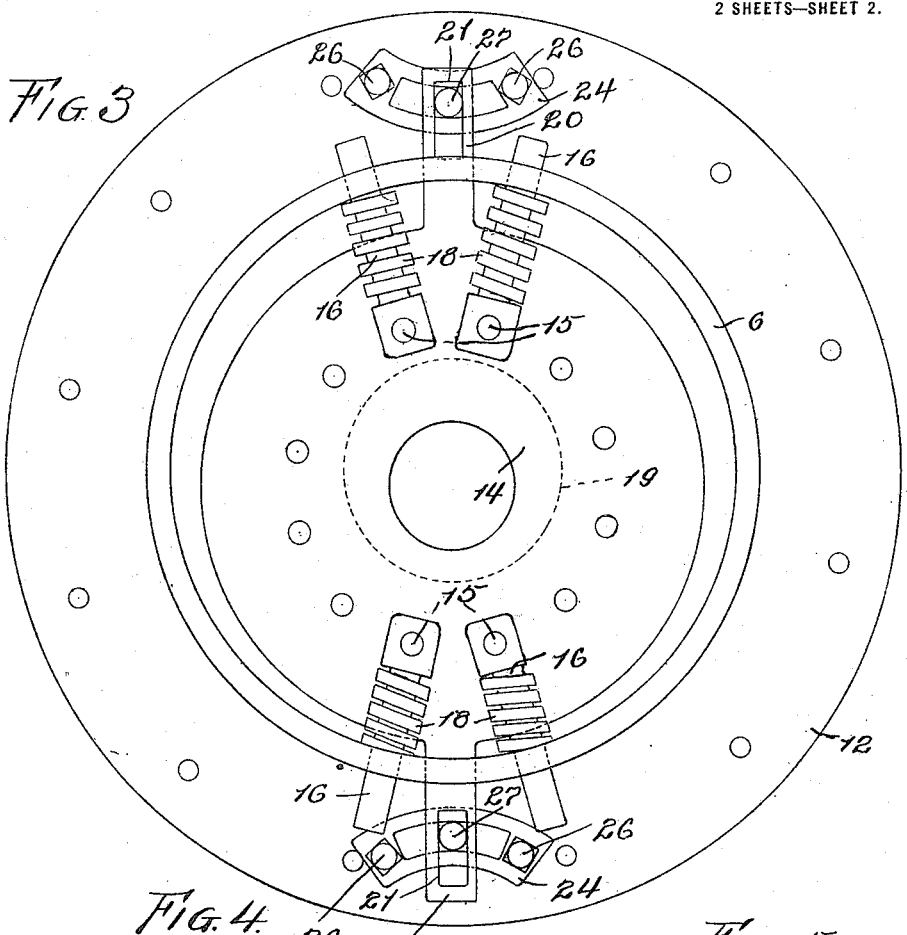
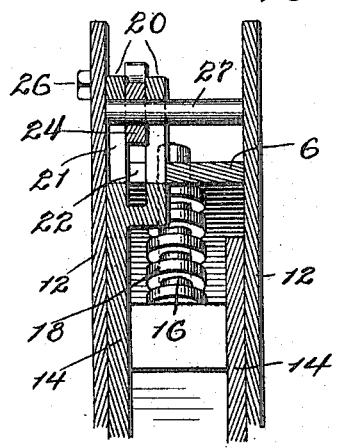
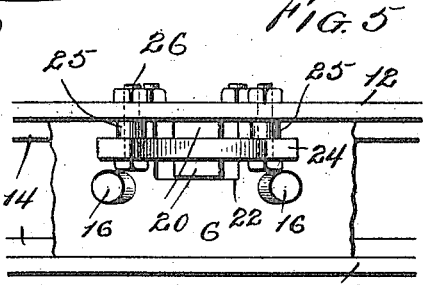
INVENTORS
T. L. GOOD AND
T. L. TANDY,
by Edward E. Longan ATTY.

UNITED STATES PATENT OFFICE.

THOMAS L. GOOD AND THOMAS L. TANDY, OF EDWARDSVILLE, ILLINOIS, ASSIGNORS OF ONE-SIXTH TO HENRY P. HOTZ, ONE-SIXTH TO ORIE T. DUNLAP, ONE-SIXTH TO WM. M. DOEBLIN, AND ONE-SIXTH TO CHARLES W. TERRY, ALL OF EDWARDSVILLE, ILLINOIS.

AUTOMOBILE-WHEEL.

1,221,529.   Specification of Letters Patent.   Patented Apr. 3, 1917.

Application filed November 11, 1916. Serial No. 130,775.

*To all whom it may concern:*

Be it known that we, THOMAS L. GOOD and THOMAS L. TANDY, citizens of the United States, and residents of Edwardsville, Madison county, Illinois, have invented certain new and useful Improvements in Automobile-Wheels, of which the following is a specification containing a full, clear, and exact description, reference being had to the accompanying drawings, forming a part hereof.

Our invention relates to improvements in automobile wheels, and the invention of this application is an improvement on the wheel shown and described in Letters Patent numbered 1,133,854, granted on March 30, 1915, to Thomas L. Good, one of the applicants herein.

The object of our invention is to simplify the construction of the wheel shown and described in the above referred to patent, making the wheel more readily assembled and economic in construction, wherein the spring spokes employed will have greater freedom of movement, thus increasing the cushioning efficiency of the wheel and to provide a novel means for connecting the hub with the tread, which will permit a slight relative rotational movement, yet provide sufficient binding to cause the tread to be moved upon application of power to the hub.

To the above purposes our invention consists of certain novel details of the construction and arrangement of parts which will be hereinafter fully, clearly and concisely set forth in our specification specifically pointed out in our claims and illustrated by the accompanying drawings, in which—

Figure 1 is an elevation, with parts broken away of a wheel embodying our improvements.

Fig. 2 is an end view partly in section and partly in elevation of the wheel taken on the line 2—2 of Fig. 1.

Fig. 3 is a diagrammatical elevation of the principal functionate parts of the wheel, certain of the spring spokes being removed in order to simplify the illustration only.

Fig. 4 is an enlarged detail sectional view taken approximately on the line 4—4 Fig. 1, with the wooden spokes removed and Fig. 5 is a plan of the parts shown in Fig. 4.

Referring by numerals to the accompanying drawings, 6 designates the hub band which forms a base for the butts of the wooden spokes 7 to the outer ends of which spokes is secured in a common manner, the wooden felly 8. Secured to the felly is a metallic rim 9, and secured in the rim is a solid tire 10. Through the butt of each of the wooden spokes 7 and transversely thereof is formed an opening through which the bolts 11 are passed, which bolts serve to hold together the cheek plates 12 as well as to tie the wooden spokes 7 to move with the hub band 6. 13 designates the hub proper which is embraced by the hub rings 14, located between and inside of the cheek plates 12. Formed through the two hub rings in axial alinement, and in radial alinement with the median lines of the wooden spokes 7 are openings forming bearings for the pivot pins 15 upon which are mounted the metallic or spring spokes 16, and formed through the hub band 6, and along the median lines of the wooden spokes 7 are openings through which the stems of the metallic or spring spokes operate, and formed in the butt of each wooden spoke 7 there is an opening 17 for the reception of the ends of the stems of said metallic or spring spokes. Each of the metallic spokes 16 is T-shaped and the heads thereof are mounted for movements upon the pivot pins 15, while their stems 16 are each embraced by an extensile coil spring 18 which springs impinge at one end with the head of the metallic spoke and at its other end with the hub band 6.

It is to be observed that the hub rings 14 are in contact at their inner peripheries with the hub 13 so as to move in all directions with the hub, and it is to be further observed that the cheek plates 12 have openings 19 which are of greater diameter than the hub so as to permit of movements diametrically between the cheek plates and said hub.

In Fig. 3 we have shown diagrammatically a single cheek plate the hub band and a single hub ring, together with diametrically opposite pairs of the metallic spokes and springs. In this figure the parts just designated are shown in positions in which a weight or load has been applied to the hub, thus the lowermost springs and spokes are compressed and extended in an outwardly direction respectively, while the uppermost springs and spokes are extended and drawn inwardly respectively, and it is to be understood in this connection that when these pairs of spokes and springs are moved one-fourth of a revolution or 90° from the position shown, the spokes will be equal distances from the center of the hub and the springs to a normal position between an extension or a compression.

Extending outwardly from one of the rings and at diametrically opposite points are the bifurcated arms 20, each of which is provided with longitudinally disposed slots 21. These arms extend through openings 22 formed in the hub band in order to allow a limited rotational movement between the hub rings and the hub band.

As clearly shown in Fig. 1, there is formed in certain of the butt ends of the wooden spokes the cavities 23 whereby to allow for limited movements of the bifurcated arms 20. Secured to one of the cheek plates and at diametrically opposite points are the slotted sectors 24 whose slots are relatively oppositely disposed and said sectors are laterally spaced and held in rigid positions by means of the sleeves 25 and bolts 26.

Extended through the slots 21 of the bifurcated arms and the slots of said sectors are the pins 27, which serve to connect the hub rings with the cheek plates, in order that the tread of the wheel will be advanced when power is applied to the hub.

By the disposition of the slots in the oppositely disposed sectors, we provide means which will bind, yet permit a slight relative rotational movement between the hub and tread when power is applied to the hub, and thus overcome excessive wear and shearing action on the connecting pins. It is to be understood that the springs 18 employed must vary in tensile strength according to the size of loads to be carried by the wheels in which they are employed.

It is to be particularly observed that the pins 27 are free to rotate in the slots of the sectors and arms of the hub rings and are held in place by having their ends in an engagement with the inner surfaces of the cheek plates. By this arrangement the pins have in effect a rolling contact with the slot surface of the sectors and arms of the hub rings, thus minimizing wear of the pins and said slot surfaces.

Having thus described our invention what we claim as new therein and desire to secure by Letters Patent is:

1. A wheel of the class described comprising a hub, a pair of hub rings secured to the hub, a plurality of spokes pivotally secured to said hub rings, a hub band having openings therethrough to receive said spokes, a plurality of extensile coil springs impinging said spokes and said band, a pair of cheek plates, a plurality of spokes rigidly connected with said cheek plates and a rim carried by said rigid spokes.

2. A wheel of the class described comprising a hub, a pair of hub rings secured to the hub, a plurality of spokes pivotally secured to said hub rings, a hub band having openings therethrough to receive said spokes, a plurality of extensile coil springs impinging said spokes and said band, a pair of cheek plates, a plurality of spokes rigidly connected with said cheek plates, devices secured to said cheek plates and having oppositely disposed curved slots and a pin and slot connection between said devices and said hub rings.

3. In a wheel of the class described a pair of hub rings, a pair of cheek plates, a means therebetween for permitting cushioned diametrical movements, radially arranged arms carried by at least one of said hub rings, each of said arms bearing a longitudinal slot, oppositely disposed sectors secured to said cheek plates and pins extended through the slots of said arms and said sectors, said pins being free to roll over the slot surfaces of said arms and sectors.

In testimony whereof, we have signed our names to this specification, in presence of two subscribing witnesses.

THOMAS L. GOOD.
THOMAS L. TANDY.

Witnesses:
CHARLES E. GUELTIG,
IRMA GUELTIG.

Copies of this patent may be obtained for five cents each, by addressing the "Commissioner of Patents, Washington, D. C."